May 23, 1950 W. MILWITT ET AL 2,508,926

CATHODE-RAY BEAM DEFLECTION CIRCUIT

Filed Aug. 28, 1947

INVENTORS
EARL H. SCHOENFELD
WILLIAM MILWITT

BY Samuel B. Smith
ATTORNEY

Patented May 23, 1950 2,508,926

UNITED STATES PATENT OFFICE 2,508,926

CATHODE-RAY BEAM DEFLECTION CIRCUIT

William Milwitt, Perth Amboy, N. J., and Earl H. Schoenfeld, Mamaroneck, N. Y., assignors to Radio Corporation of America, a corporation of Delaware Application August 28, 1947, Serial No. 771,048

3 Claims. (Cl. 315—26)

The present invention relates to cathode ray beam deflection circuits of the electrostatic type, and more particularly relates to means for overcoming certain non-linearities of scan which may result from the presence of inductive loading in the output circuit of the deflection generators.

In cathode ray beam deflection circuits of the above nature the two horizontal, or line, deflection plates of a cathode ray tube are frequently supplied with balanced potentials in order to prevent a de-focussing of the scanning beam. The means for obtaining such potentials may include a pair of power output tubes arranged in push-pull relation, and, especially in cases where the supply voltage is of relatively low value, a center-tapped choke coil is frequently employed the ends of which are respectively connected to the anodes of the power tubes. In such a circuit arrangement the effective load may be considered to include the choke coil in shunt with the capacitances of the power output tubes, the cathode ray beam deflection plates, and the wiring, as well as the distributed coil capacity itself.

If the impedance of this load is high relative to the internal resistance of the power tubes over a band of frequencies from the fundamental line frequency to approximately its tenth harmonic, there will be negligible phase and amplitude distortion in the sine wave components making up the sawtooth deflecting wave. This, however, requires that the choke coil have considerable inductance and a sufficiently high Q at the fundamental line frequency. It also requires that the shunting capacitance be relatively small at the tenth harmonic of the line frequency.

When a choke coil having the above characteristics is employed, a series of vertical bars, or striations, frequently appear in the reproduced image. The bars are most noticeable near one side of the image raster and decrease in intensity in the direction of scanning. It has been found that these bars are caused by variations in the speed of the electron scanning beam as it moves across the face of the cathode ray tube, and that these variations in turn result from damped oscillations, or "transients," in the horizontal deflecting wave. They may have a frequency, for example, of about 300 kilocycles per second.

If the choke coil is considered to be made up of distributed inductance and capacitance, then it may be regarded as a virtual (or artificial) transmission line composed of a number of L-C (inductance and capacity) units connected in series, each unit being composed of one turn of wire together with the distributed capacitance of this turn to ground. As such, it will be appreciated that the appearance of a sharp voltage pulse at each end of the choke at the beginning of retrace time will cause a voltage wave to travel from each end of the choke toward the tapped center. At this point, the wave encounters an A. C. (alternating current) short circuit imposed by the supply voltage source.

This short circuit produces a reflection of each voltage wave front back toward the plate of its respective power tube. However, since the tube impedance does not properly terminate the "line," another reflection occurs, and this process continues until the reflected wave is damped to a negligible level. By this time, however, the cathode ray scanning beam has been deflected a considerable distance across the image raster area.

The vertical bars, or striations, which are produced in the above manner may be substantially reduced by the expedient of terminating the choke coil "transmission line" with a resistance the value of which is approximately equal to the characteristic or surge impedance of the "line." This resistance is preferably connected between the center tap of the choke coil and the positive terminal of the supply voltage source, this positive voltage terminal being in effect the termination of each of the two "transmission lines" formed by the two halves of the choke coil winding. Since the surge impedance of the "lines" in many cases is best determined experimentally, a variable resistor may be employed at such point which has a sufficiently wide range of values to include the one required.

One object of the present invention, therefore, is to provide an improved type of horizontal, or line, deflection system for use with electrostatically-deflected image-reproducing cathode ray tubes.

Another object of the invention is to provide an improved cathode ray beam deflection system of the electrostatic type, in which means are included for overcoming the vertical bars or striations which are produced in the image raster due to internal voltage reflections in the choke-loaded push-pull amplifier.

A further object of the invention is to provide a system of balanced, or push-pull, electrostatic deflection for cathode ray tubes, in which a center-tapped choke coil in the output circuit of the push-pull amplifier is considered to be a virtual transmission line which is terminated by a resistor the value of which is approximately equal to the characteristic or surge impedance of the line.

Other objects and advantages will be apparent from the following description of a preferred form of the invention and from the drawing, in which.

Figures 1, 2, 3:
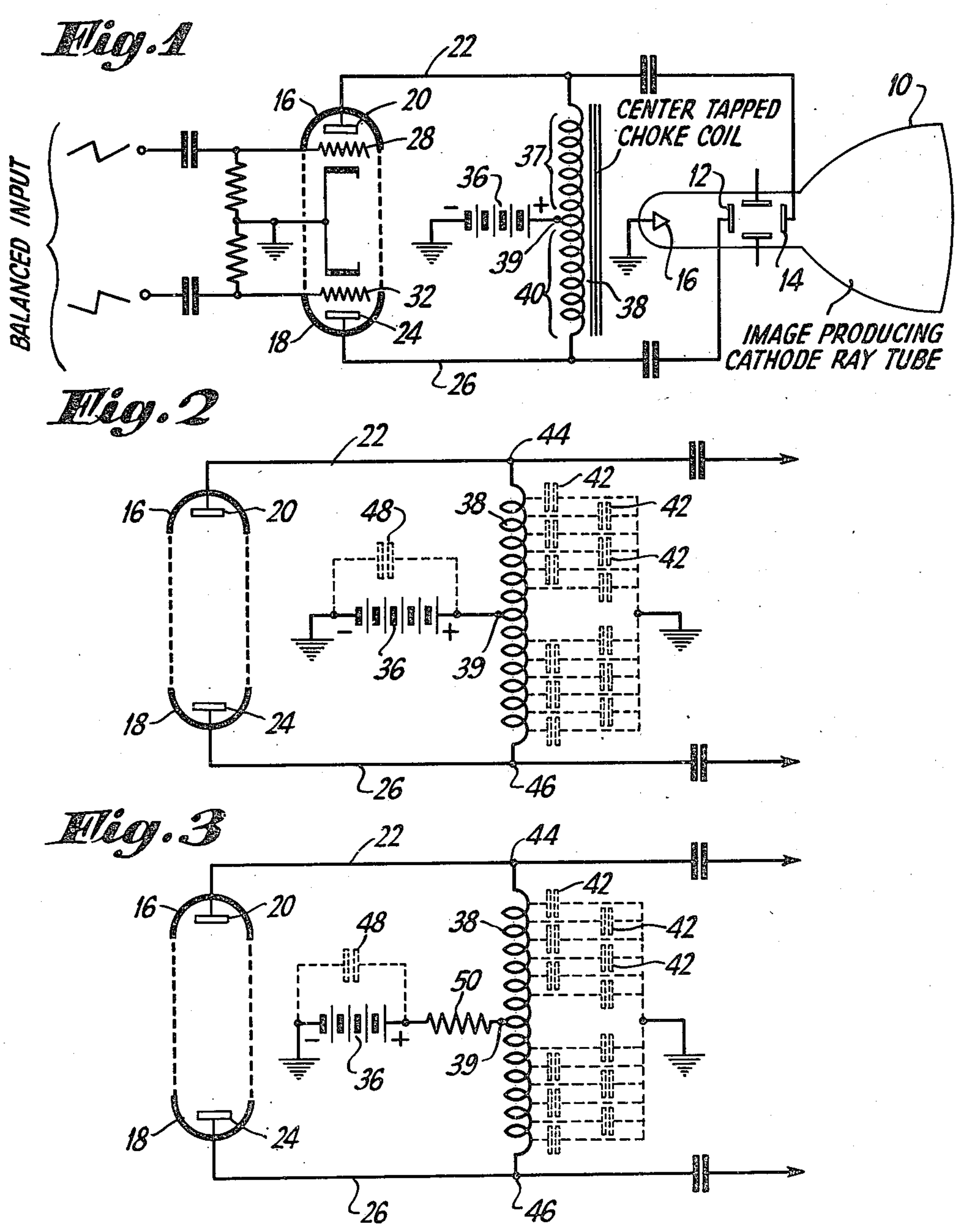
Fig. 1 is a circuit diagram of a horizontal cathode ray beam deflection circuit of the electrostatic type, employing a center-tapped choke coil in the output circuit of a push-pull amplifier.
Fig. 2 illustrates a portion of Fig. 1 redrawn in such a manner as to represent the choke coil as an artificial transmission line having distributed capacity to ground between each turn of the coil.
Fig. 3 is a modification of Fig. 2, in which a resistor is inserted between the center-tap of the choke coil and one terminal of the source of potential.

Referring now to the drawing, there is shown an image-reproducing cathode ray tube generally indicated by the reference numeral 10. Tube 10 is an electrostatically-deflected cathode ray tube of any suitable type which includes a pair of horizontal, or line, deflection plates 12 and 14. Tube 10 will also be understood to include the usual electron gun 15 for developing and directing a beam of electrons toward the luminescent screen or target (not shown) within tube 10.

The horizontal, or line, deflection plates 12, 14 are provided with balanced deflecting potentials of substantially saw-tooth waveform from a line deflection generator which includes a pair of electron discharge devices 16, 18. These electron discharge devices 16, 18 may comprise the two portions of a twin triode (such as a 6SN7) as shown in the drawing.

The anode 20 of the electron discharge device 16 is connected to the horizontal deflecting plate 14 by means of a conductor 22. Similarly, the anode 24 of the electron discharge device 18 is connected to the horizontal deflecting plate 12 by means of a conductor 26. In order that the potentials applied to the horizontal deflecting plates 12, 14 be balanced to ground, the control electrode 28 of the electron discharge device 16 is supplied with a control voltage the waveform of which is approximately that of a rising saw-tooth, as indicated in the drawing by the reference numeral 30. The control electrode 32 of the electron discharge device 18, on the other hand, is supplied with a control voltage the waveform of which is substantially that of a falling saw-tooth, as indicated in the drawing by the reference numeral 34. The control voltage waves 30 and 34, of course, are substantially 180° out-of-phase with one another, as is the usual procedure in circuits of the type described.

The anode 20 of the electron discharge device 16 is connected to the positive terminal of a source of potential 36 through one portion 37 of a choke coil 38, the latter being provided with a center-tap 39 in order to permit such connection. Correspondingly, the anode 24 of the electron discharge device 18 is connected to the positive terminal of the supply voltage source 36 through the remaining portion 40 of the choke coil 38. The negative terminal of the supply voltage source 36 is grounded as shown, as is also each cathode of the twin triode 16, 18.

In considering the operation of the circuit of Fig. 1, the effective load of the electron discharge tubes 16, 18 may be taken to include the choke coil 38 in shunt with the capacitances of the tubes 16, 18, the cathode ray beam deflection plates 12, 14, and the wiring capacity. The distributed capacity of the choke coil 38 is also a factor.

When the impedance of this load is high relative to the internal resistance of the electron discharge tubes 16, 18 over a band of frequencies from the fundamental line-scanning frequency to approximately its tenth harmonic, there will be negligible phase and amplitude distortion in the sine wave components making up the saw-tooth deflecting wave applied to the deflecting plates 12, 14. This, however, is true only if the choke coil 38 has considerable inductance and a relatively high Q at the fundamental line-scanning frequency. It also necessitates that the reactances of the shunting capacitances be relatively low at the tenth harmonic of the line-scanning frequency.

The use of a choke coil having the above characteristics frequently causes a series of vertical bars, or striations, to appear in the reproduced image, these bars being more noticeable near one side of the image raster and decreasing in intensity in the direction of scanning. They may have a frequency, for example, of about 300 kilocycles per second, and can be traced to the presence of damped oscillations, or "transients," in the horizontal deflecting wave.

Referring now to Fig. 2 it will be seen that the choke coil 38 may be considered to be made up of distributed inductance and capacitance. In other words, it may be regarded as a virtual transmission line composed of a number of L-C units connected in series, each such unit being composed of one turn of wire together with the distributed capacitance of this turn to ground. In Fig. 2 the distributed capacitances of the turns of the choke coil 38 are represented schematically by the condensers 42 (shown in dotted lines).

It will now be appreciated that the appearance of a sharp voltage pulse at the terminals 44 and 46 of the choke coil 38 at the beginning of retrace time will cause a voltage wave to travel from each end of the choke coil toward the tapped center point 39. At this point, the voltage wave encounters an A. C. short circuit 48 imposed by the supply voltage source 36.

This short circuit 48 produces a reflection of each voltage wave front back toward the plate of its respective power tube 16 or 18. However, since the impedance of the tubes 16 and 18 does not properly terminate the virtual transmission line, another reflection occurs, and this process continues until the reflected wave is damped to a negligible level. By this time, however, the cathode ray scanning beam has been deflected a considerable distance across the image raster area.

The above objectionable effects of these reflections may be substantially reduced by the expedient of terminating the choke coil "transmission line" with a resistor 50 the value of which is approximately equal to the characteristic, or surge, impedance of the line. As shown in Fig. 3, this resistor 50 is preferably connected between the center tap 39 of the choke coil 38 and the positive terminal of the supply voltage source 36, this positive voltage terminal being in effect the termination of each of the two "transmission lines" formed by the two halves 37 and 40 (Fig. 1) of the choke coil 38. By terminating the choke coil "transmission line" with its characteristic or surge impedance, the line becomes infinitely long, and no reflections can occur therein. This, of course, results in the elimination or reduction of the vertical bars otherwise present in the reproduced image.

Since the value of resistor 50 in many cases is best determined experimentally, it may, if desired, be advisable to employ a variable resistor which has a sufficiently wide range of values to include the one required.

In cases where the values of the remaining circuit components are known, such, for example, as in the mass production of television receivers, it is possible to incorporate the separate resistor 50 as an integral part of the choke coil 38 by employing wire having a predetermined resistance per unit length for winding the choke, the resistance value of the wire being determined by the capacitance of the choke. In such an event, each turn of the choke coil would pass the voltage wave instead of causing a reflection thereof, in much the same manner, as in the case of a line of infinite length.

We claim:

1. In a cathode ray beam deflection circuit of the electrostatic type for use with a cathode ray tube having a pair of deflecting plates to which saw-tooth voltages are supplied by a pair of power tubes connected in push-pull relationship, a center-tapped choke coil arranged so that one portion lies in the output circuit of one of said power tubes and the other portion thereof lies in the output circuit of the other of said power tubes, connections between the ends of said choke coil, respectively, and said pair of deflecting plates, a terminal for connecting the output circuit of each of said power tubes to a voltage source, and a terminating resistor connected between the said terminal and the center tap of said choke coil, said terminating resistor having a value approximately equal to the surge impedance of said choke coil when the latter is considered as a virtual transmission line.

2. A cathode ray beam deflection circuit according to claim 1, in which said terminating resistor is adjustable to determine the value thereof which is equal to the surge impedance of said choke coil.

3. In a cathode ray beam deflection circuit of the type in which two power output tubes arranged in push-pull relationship are adapted to supply balanced cyclically varying voltages of the two line deflection plates, respectively, of an electrostatically deflected cathode ray tube, and in which a tapped choke coil is employed in such a manner that one portion of said choke coil lies in the output circuit of one of the said power output tubes and the remaining portion of said choke coil lies in the output circuit of the other of said power output tubes, the tap on said choke coil being normally connected to the positive terminal of a D.-C. potential source, the improvement which comprises a terminating resistor having a value approximately equal to the surge impedance of the said choke coil, when the latter is considered as a virtual transmission line, connected between the tap on said choke coil and the positive terminal of the said D.-C. potential source, whereby reflections of the said cyclically varying voltages generated by the said power output tubes are prevented from occurring within the said choke coil.

WILLIAM MILWITT.
EARL H. SCHOENFELD.

REFERENCES CITED

The following references are of record in the file of this patent:

UNITED STATES PATENTS

| Number | Name | Date |
|---|---|---|
| 2,077,574 | Maloff | Apr. 20, 1937 |
| 2,086,926 | Stocker | July 13, 1937 |
| 2,101,520 | Tolson et al. | Dec. 7, 1937 |
| 2,149,077 | Vance | Feb. 28, 1939 |